United States Patent
Shirai et al.

(10) Patent No.: US 9,755,756 B2
(45) Date of Patent: Sep. 5, 2017

(54) TRANSMISSION DEVICE, TRANSMISSION SYSTEM, AND TRANSMISSION METHOD

(71) Applicant: FUJITSU LIMITED, Kawasaki-shi, Kanagawa (JP)

(72) Inventors: Katsuhiro Shirai, Kawasaki (JP); Tetsuya Uchida, Kawasaki (JP); Hayato Furukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 14/847,099

(22) Filed: Sep. 8, 2015

(65) Prior Publication Data

US 2015/0381280 A1    Dec. 31, 2015

Related U.S. Application Data

(63) Continuation of application No. PCT/JP2013/057802, filed on Mar. 19, 2013.

(51) Int. Cl.
| | |
|---|---|
| *H04J 14/02* | (2006.01) |
| *H04B 10/508* | (2013.01) |
| *H04J 14/00* | (2006.01) |
| *H04J 3/16* | (2006.01) |
| *H04J 3/12* | (2006.01) |
| *H04J 3/14* | (2006.01) |

(52) U.S. Cl.
CPC .......... *H04B 10/508* (2013.01); *H04J 3/1652* (2013.01); *H04J 14/00* (2013.01); *H04J 14/02* (2013.01); *H04J 3/12* (2013.01); *H04J 3/14* (2013.01)

(58) Field of Classification Search
CPC ........ H04B 10/508; H04J 3/1652; H04J 3/12; H04J 3/14; H04J 14/00; H04J 14/02

USPC ...................................... 398/79, 43
See application file for complete search history.

(56) References Cited

U.S. PATENT DOCUMENTS

| | | | |
|---|---|---|---|
| 6,842,455 B1 | 1/2005 | Heuer | |
| 2002/0027684 A1* | 3/2002 | Ait Sab | .............. H04J 14/02 |
| | | | 398/79 |
| 2003/0043861 A1 | 3/2003 | Saito | |
| 2010/0287449 A1 | 11/2010 | Kubo et al. | |

FOREIGN PATENT DOCUMENTS

| | | |
|---|---|---|
| JP | 10-242942 | 9/1998 |
| JP | 11-122218 | 4/1999 |
| JP | 2001-060931 | 3/2001 |

(Continued)

OTHER PUBLICATIONS

Interfaces for the Optical Transport Network (OTN), ITU-T, G.709/Y.1331 (Dec. 2009); Series G: Transmission Systems and Media, Digital Systems and Networks, Digital terminal equipments—General; Series Y: Global Information Infrastructure, Internet Protocol Aspects and Next-Generation Networks, Internet protocol aspects—Transport (218 pages).

(Continued)

*Primary Examiner* — M. R. Sedighian
(74) *Attorney, Agent, or Firm* — Fujitsu Patent Center

(57) ABSTRACT

A transmission device includes: a payload generator configured to generate a payload; and an adding unit configured to add payload information on the payload to the payload, wherein the payload to which the payload information is added is transmitted via a first lane, and management information on the first lane is transmitted via a second lane.

13 Claims, 18 Drawing Sheets

(56) References Cited

FOREIGN PATENT DOCUMENTS

| JP | 2001-230732 | 8/2001 |
|----|-------------|--------|
| JP | 2002-118540 | 4/2002 |
| JP | 2003-078496 | 3/2003 |
| JP | 2010-263555 | 11/2010 |
| JP | 2011-61636 | 3/2011 |
| WO | 2004/040811 A1 | 5/2004 |

OTHER PUBLICATIONS

International Search Report and Written Opinion of the International Searching Authority (Form PCT/SA/210, Form PCT/ISA/237), mailed in connection with PCT/JP2013/057802 and mailed May 7, 2013, with English translation (3 pages).

JPOA—Office Action of Japanese Patent Application No. 2015-506441 dated Aug. 2, 2016., with full English translation of the Office Action.

* cited by examiner

FIG. 4A

| Byte Row | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 | FAS | | | | | | MFAS | SM | | | | | RES | | JC | | |
| 2 | RES | PM&TCM *4 | TCM ACT | TCM6 TTI / BIP-8 / *3 | | | | TCM5 TTI / BIP-8 / *3 | | | TCM4 TTI / BIP-8 / *3 | | | FTFL | RES | | |
| 3 | TCM3 TTI / BIP-8 / *3 | | | TCM2 TTI / BIP-8 / *3 | | | | TCM1 TTI / BIP-8 / *3 | | | PM TTI / BIP-8 / *2 | | | EXP | PSI | NJO | PJO |
| 4 | GCC1 | | GCC2 | | | APS/PCC | | | | | RES | | | | | | |

FIG. 4B
*1

| 1 | 2 | 3 | 4 | 5 | 6 | 7 | 8 |
|---|---|---|---|---|---|---|---|
| BEI/BIAE | | | | BDI | IAE | RES | |

FIG. 4C
*2

| 1 | 2 | 3 | 4 | 5 | 6 | 7 | 8 |
|---|---|---|---|---|---|---|---|
| BEI | | | | BDI | STAT | | |

FIG. 4D
*3

| 1 | 2 | 3 | 4 | 5 | 6 | 7 | 8 |
|---|---|---|---|---|---|---|---|
| BEIi/BIAEi | | | | BDIi | STATi | | |

FIG. 4E
*4

| 1 | 2 | 3 | 4 | 5 | 6 | 7 | 8 |
|---|---|---|---|---|---|---|---|
| DMt1 | DMt2 | DMt3 | DMt4 | DMt5 | DMt6 | DMp | RES |

FIG. 5

| Byte Row | 1 | | | | ... | 4080 |
|---|---|---|---|---|---|---|
| 1 | 1:16 (FAS) | 17:32 | 33:48 | 49:64 | | 4065:4080 |
| 2 | 4081:4096 | 4097:5012 | 5013:5028 | 5029:5044 | ...... | 9145:9160 |
| 3 | 9161:9176 | 9177:9192 | 9193:9208 | 9209:9224 | | 12225:12240 |
| 4 | 12241:12256 | 12257:12272 | 12273:12288 | 12289:13304 | | 16305:16320 |

FIG. 10A

| FAS | MFAS | SM | | | TCM6 | | TCM5 | | TCM4 | | TCM3 | | TCM2 | | TCM1 | |
|---|---|---|---|---|---|---|---|---|---|---|---|---|---|---|---|---|
| | | BIP-8 | *1 | | BIP-8 | *3 | BIP-8 | *3 | BIP-8 | *3 | BIP-8 | *3 | BIP-8 | *3 | BIP-8 | *3 |
| | | PM | | | EXP | | *4 | | JC1 | JC2 | JC3 | JC4 | JC5 | JC6 | NJO | PJO PJO |
| | | BIP-8 | *2 | | | | | | | | | | | | | |

FIG. 10B *1

| 1 | 2 | 3 | 4 | 5 | 6 | 7 | 8 |
|---|---|---|---|---|---|---|---|
| BEI/BIAE | | | | BDI | IAE | RES | |

FIG. 10C *2

| 1 | 2 | 3 | 4 | 5 | 6 | 7 | 8 |
|---|---|---|---|---|---|---|---|
| BEI | | | | BDI | STAT | | |

FIG. 10D *3

| 1 | 2 | 3 | 4 | 5 | 6 | 7 | 8 |
|---|---|---|---|---|---|---|---|
| BEIi/BIAEi | | | | BDIi | STATi | | |

FIG. 10E *4

| 1 | 2 | 3 | 4 | 5 | 6 | 7 | 8 |
|---|---|---|---|---|---|---|---|
| FEC INFORMATION | THROUGH INFORMATION | FRAME ID | | | | | |
| | | FRAME ID | | | | | |

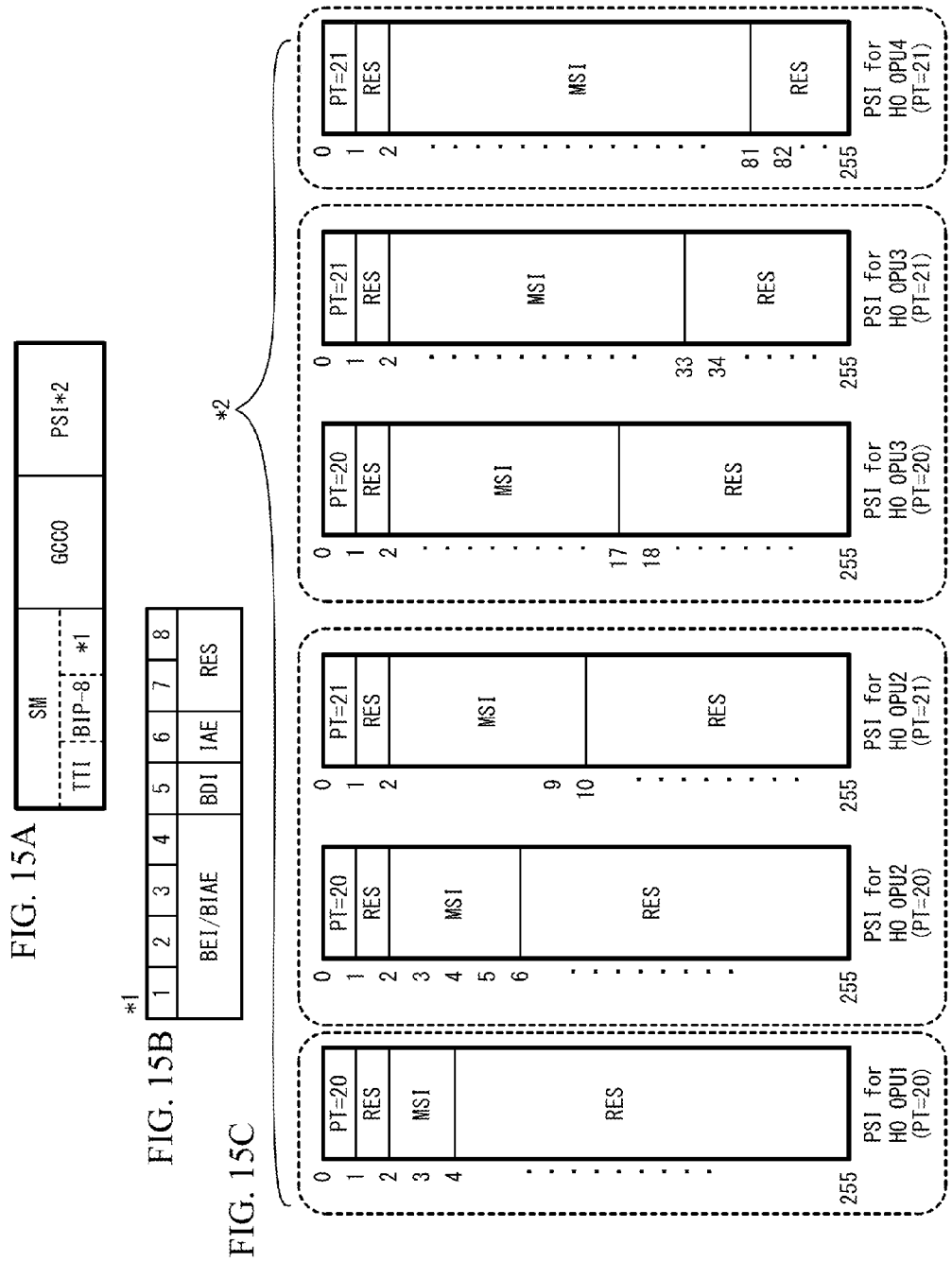

*1

*2

*3

TRANSMISSION DEVICE, TRANSMISSION SYSTEM, AND TRANSMISSION METHOD

CROSS-REFERENCE TO RELATED APPLICATION

This application is a continuation application of International Application PCT/JP2013/057802 filed on Mar. 19, 2013 and designated the U.S., the entire contents of which are incorporated herein by reference.

FIELD

A certain aspect of embodiments described herein relates to a transmission device, a transmission system, and a transmission method.

BACKGROUND

The increasing demand for telecommunications has promoted standardization of high-speed optical transmission methods. For example, ITU-T (International Telecommunication Union Telecommunication Standardization Sector) Recommendation G.709 defines technology for an Optical Transport Network (OTN) of approximately 2.5 to 100 Gbps as disclosed in International Telecommunication Union, "Interfaces for the Optical Transport Network (OTN)", ITU-T Recommendation G.709/Y.1331, 2009-12.

The optical transmission over the OTN multiplexes optical signals, each accommodating a client signal, by Wavelength Division Multiplexing (WDM), enabling high-capacity transmission. Examples of the client signal accommodated in an optical signal include a Synchronous Digital Hierarchy (SDH) frame, a Synchronous Optical NET (SONET) frame, and an Ethernet (registered trademark) frame.

The frame of the optical signal transmitted over the OTN is called an Optical channel Transport Unit (OTU) frame, and has an overhead, which is control information, a payload containing the client signal, and a Forward Error Correction (EFC), which is an error-correction code. The OTU frame is distributed to, for example, 20 logical lanes and transmitted. At this time, the OTU frame is divided into 16-byte blocks where the overhead, the payload, and the FEC are not distinguished. The blocks are sequentially distributed to the lanes, and transmitted by individual carrier waves of the lanes.

SUMMARY

According to an aspect of the present invention, there is provided a transmission device including: a payload generator configured to generate a payload; and an adding unit configured to add payload information on the payload to the payload, wherein the payload to which the payload information is added is transmitted via a first lane, and management information on the first lane is transmitted via a second lane.

According to another aspect of the present invention, there is provided a transmission system including: a first transmission device that generates a payload, and adds payload information on the payload to the payload; and a second transmission device coupled to the first transmission device, wherein the first transmission device transmits the payload to which the payload information is added via a first lane, and transmits management information on the first lane via a second lane, and the second transmission device receives a signal transmitted via the first lane and a signal transmitted via the second lane.

According to another aspect of the present invention, there is provided a transmission method including: generating a payload; adding payload information on the payload to the payload; transmitting the payload to which the payload information is added via a first lane; and transmitting management information on the first lane via a second lane.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A through FIG. 4E are diagrams illustrating a structure of an overhead of the OTU frame;

FIG. 5 is a diagram illustrating blocks obtained by dividing the OTU frame;

FIG. 10A through FIG. 10E are diagrams illustrating the content of a first overhead;

FIG. 15A through FIG. 15C are diagrams illustrating the content of the second overhead in the alternative embodiment;

DESCRIPTION OF EMBODIMENTS

To increase the transmission rate of the OTU frame, optical transceivers having a high transmission rate may be used for the transmission process in each logical lane. In this case, the bandwidths of the overhead, the payload, and the FEC contained in the OTU frame increase with keeping the proportions the same due to the aforementioned transmission process performed in units of blocks.

The overhead and the FEC have data quantities sufficiently less than the data quantity of the payload, and thus may not be necessarily transmitted at a transmission rate same as that of the payload. Therefore, the increase in the bandwidths of the overhead and the FEC decreases the use efficiency of the bandwidth.

Figure 1:
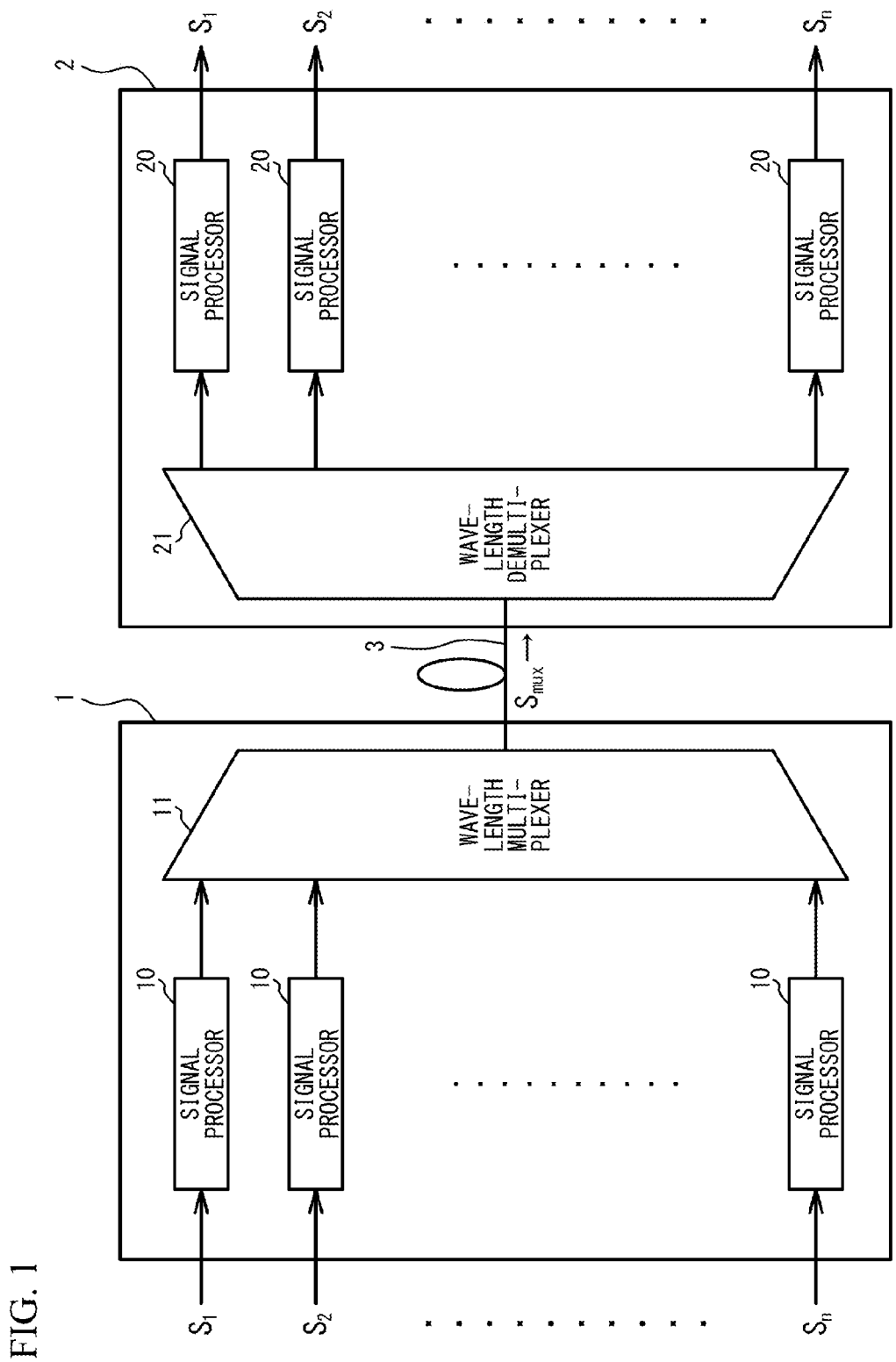
FIG. 1 is a configuration diagram of a transmission system in accordance with an embodiment.

FIG. 1 is a configuration diagram of a transmission system in accordance with an embodiment. The transmission system includes a first transmission device 1 and a second transmission device 2 interconnected via a transmission line 3. The first transmission device 1 wavelength-multiplexes and transmits client signals $S_1 \sim S_n$, which are input from an external network, to the second transmission device 2 via the transmission line 3 as a multiplexed optical signal Smux.

The second transmission device 2 receives and wavelength-demultiplexes the multiplexed optical signal Smux to obtain the client signals $S_1 \sim S_n$, and transmits them to another external network. In the present specification, the client signals $S_1 \sim S_n$ are signals input and output between the transmission system and external networks.

The first transmission device 1 includes signal processors 10 and a wavelength multiplexer 11, and is supplied with the client signals $S_1 \sim S_n$ from an external network. Each of the signal processors 10 transmits the corresponding client signal $S_1 \sim S_n$, via logical lanes. The logical lane is a path for a sequence of signal processing provided to the circuit of the signal processor 10 or the functional unit implemented by software. When the client signals $S_1 \sim S_n$ have the same wavelengths, the first transmission device 1 converts the wavelengths of the client signals $S_1 \sim S_n$ into the wavelengths different from each other.

The data of each of the client signals $S_1 \sim S_n$ is distributed to the logical lanes and processed in parallel. Each of the signal processor 10 superimposes the corresponding client signal $S_1 \sim S_n$, on carrier waves with different wavelengths to transmit it.

The wavelength multiplexer 11 wavelength-multiplexes the carrier waves (i.e., optical signals) transmitted from the signal processors 10. The wavelength multiplexer 11 may be a multiplexer such as an Arrayed Waveguide Grating (AWG), a Wavelength Selective Switch (WSS), or an optical coupler.

The wavelength multiplexer 11 wavelength-multiplexes, for example, 88 waves with a transmission rate of 100 Gbps, and can transmit the multiplexed optical signal Smux of 8.8 Tbps. The multiplexed optical signal Smux is input to the second transmission device 2 via the transmission line 3 such as an optical fiber.

The second transmission device 2 includes signal processors 20 and a wavelength demultiplexer 21. The wavelength demultiplexer 21 de-multiplexes the multiplexed optical signal Smux into optical signals with different wavelengths, and outputs them to the signal processors 20. The wavelength demultiplexer 21 may be a demultiplexer such as an arrayed waveguide grating or a wavelength selective switch. Each of the signal processors 20 performs reception processing of the optical signals in the logical lanes, and outputs the corresponding client signal $S_1 \sim S_n$, to an external network.

As described above, the transmission system transmits the multiplexed optical signal Smux via the single transmission line 3, thus reducing the cost of facilities and enabling high-capacity transmission. The present embodiment uses the single transmission line 3, but does not intend to suggest any limitation. Multiple transmission lines may be used.

Figure 2:
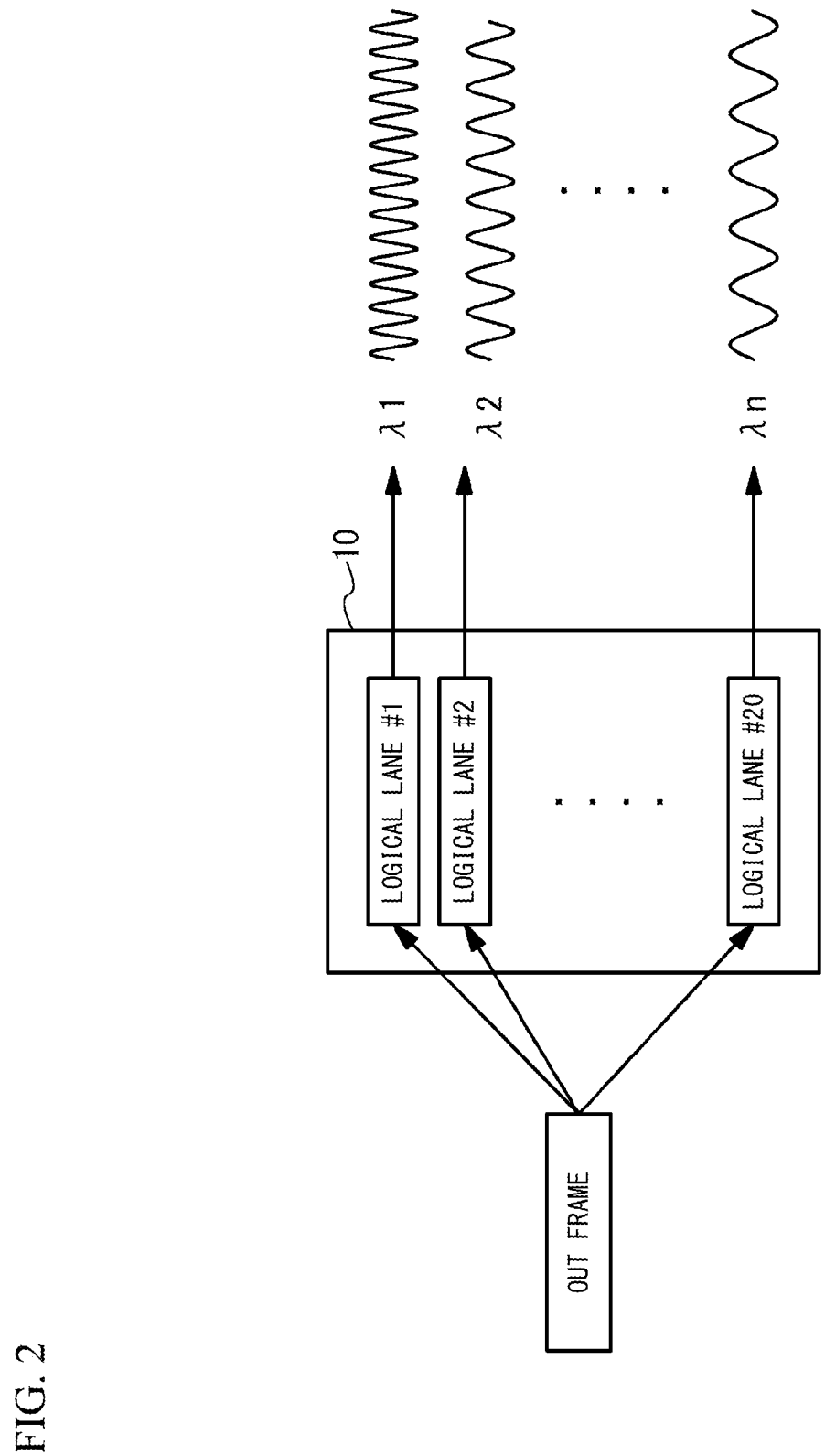
FIG. 2 is a diagram illustrating a transmission method in accordance with a comparative example.

A description will next be given of a transmission method in the signal processors 10. FIG. 2 illustrates a transmission method in accordance with a comparative example. The transmission method of the comparative example is a method according to ITU-T Recommendation G.709. Hereinafter, an OTN defined in ITU-T Recommendation G.709 will be described as an example, but the scope of application of the embodiment described in the present specification is not limited thereto.

In the comparative example, each of the signal processors 10 transmits an OTU frame into which the corresponding client signal $S_1 \sim S_n$, is mapped. The OTU frame is divided into blocks, distributed to, for example, logical lanes #1~#20, and transmitted. The OTU frame is superimposed on a single carrier wave and transmitted.

Figure 3:
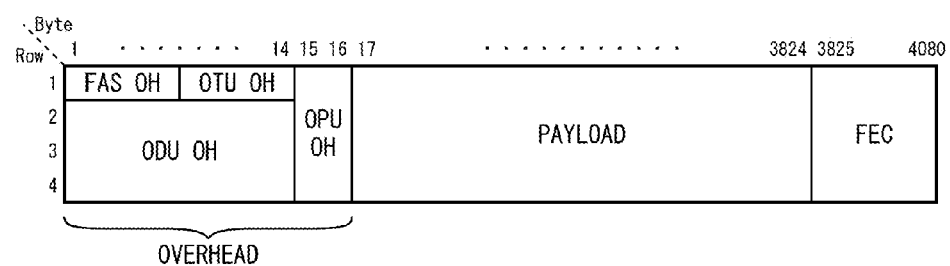
FIG. 3 is a diagram illustrating a structure of an OTU frame.

FIG. 3 is a diagram illustrating the structure of the OTU frame. The OTU frame has three areas: an overhead area, a payload area, and an FEC area. The overhead is represented by "OH" in FIG. 3.

The overhead area contains a Frame Alignment Signal (FAS) overhead, an OTU overhead, an Optical channel Data Unit (ODU) overhead, and an Optical channel Payload Unit (OPU) overhead. Each overhead includes various types of control information. Additionally, the payload area contains Tributary Slots (TSs), which are logical channels and not illustrated, and maps a client signal Si into the TSs.

FIG. 4A through FIG. 4E are diagrams illustrating the structure of the overhead of the OTU frame. "Row" and "Byte" in FIG. 4A correspond to "Row" and "Byte" in FIG. 3, respectively. Additionally, the contents of "*1" through "*4" in the frame of FIG. 4A are presented in FIG. 4B through FIG. 4E, respectively.

The FAS overhead contains FAS and Multi-Frame Alignment Signal (MFAS), and is used for frame synchronization in the receiving side second transmission device 2. In other words, the FAS overhead is unique pattern data indicating the head of the OTU frame. The data defined in Byte 6 of the FAS field corresponds to the Logical Lane Marker (LLM) of a logical lane.

The OTU overhead provides monitoring functions, and contains Section Monitoring (SM), General Communication Channel 0 (GCC0), and Reserved for future international standardization (RES). The SM field contains the following subfields: Trail Trace Identifier (TTI), and Bit Interleaved Parity level 8 (BIP-8). The SM field further contains the following subfields: Backward Error Indication and Backward Incoming Alignment Error (BEI/BIAE), Backward Defect Indication (BDI), Incoming Alignment Error (IAE), and RES.

The ODU overhead contains RES, Path Monitoring & Tandem Connection Monitoring (PM&TCM), Activation/deactivation Control Channel (TCM ACT), TCM1~TCM6, and Fault Type and Fault Location reporting channel (FTFL). The ODU overhead further contains PM, Experimental (EXP), GCC1, GCC2, and Automatic Protection Switching coordination channel and Protection Communication Channel (APS/PCC). The PM&TCM field contains the following subfields: Delay Measurement of TCM1 (DMt1)~DMt6, Delay Measurement of ODUk path (DMp), and RES.

Each of TCM1~TCM6 fields contains the following subfields: TTI, BIP-8, BEIi/BIAEi, BDIi, and Status i (STATi) (i=1~6). The PM field contains the following subfields: TTI, BIP-8, BEI, BDI, and STAT.

The OPU overhead contains Payload Structure Identifier (PSI), Justification Control (JC), Negative Justification Opportunity (NJO), Positive Justification Opportunity (PJO), and RES. The RES is used as JC when the Generic Mapping Procedure (GMP) is used. The details of the above described parameters are defined in ITU-T Recommendation G.709.

FIG. 5 is a diagram illustrating blocks obtained by dividing the OTU frame. "Row" and "Byte" in FIG. 5 correspond to "Row" and "Byte" in FIG. 3 and FIG. 4A, respectively.

The blocks are obtained by sequentially dividing the data in each Row of the OTU frame every 16 Bytes. The leading block contains the above described FAS overhead. The blocks are distributed to the logical lanes #1~#20 and transmitted.

Figure 6:
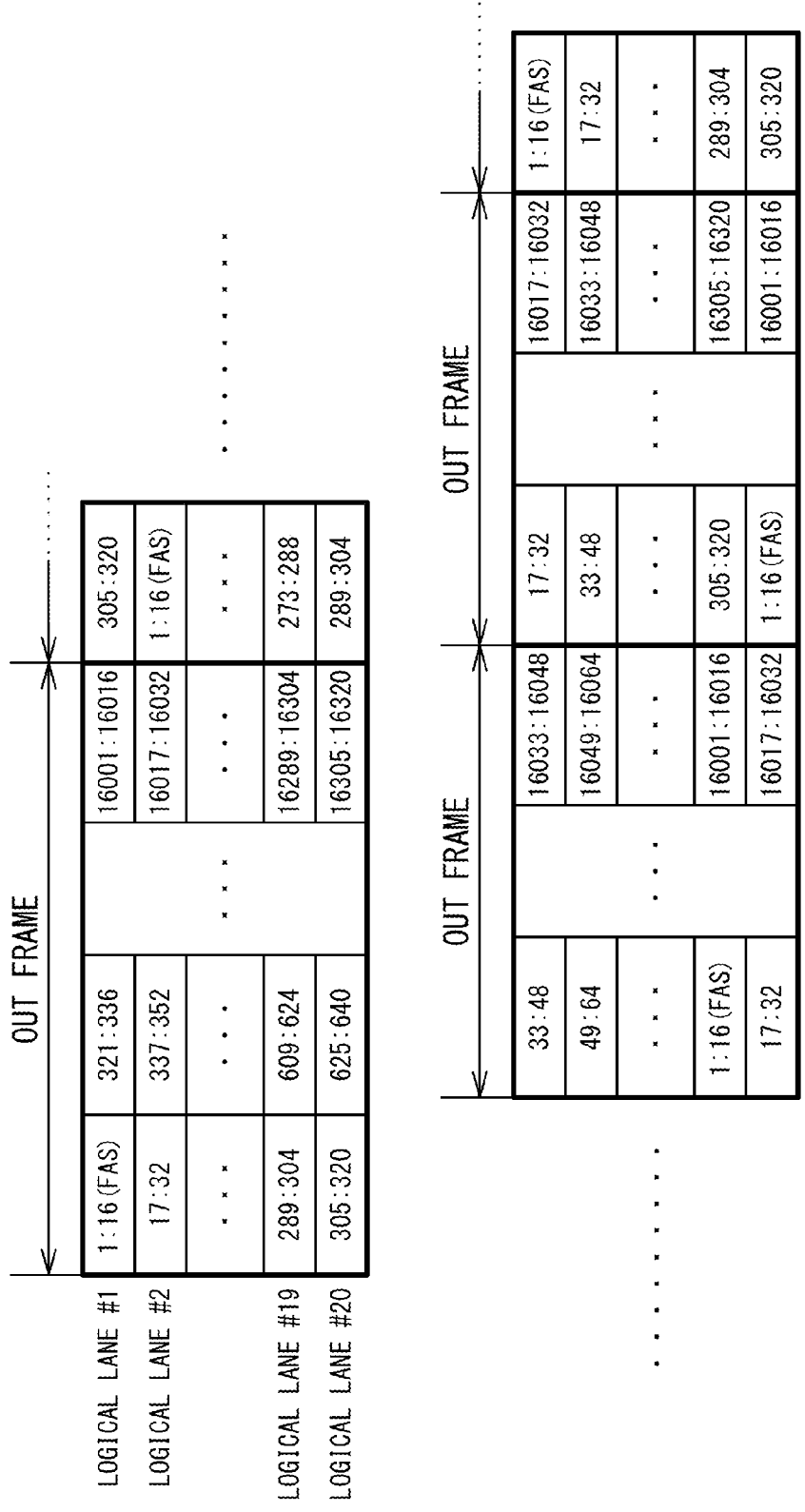
FIG. 6 is a diagram illustrating distribution of the blocks to logical lanes.

FIG. 6 illustrates the distribution of the blocks to the logical lanes. In the successively transmitted OTU frames, the leading blocks containing the FAS overhead (see "1:16 (FAS)") are sequentially distributed to the logical lanes #1~#20. Thus, the detection of the FAS overheads allows the receiving side second transmission device 2 to perform not only frame synchronization but also skew adjustment among the logical lanes #1~#20 and to reconstruct the OTU frame.

The transmission method of the comparative example distributes the blocks to the logical lanes #1~#20 without distinguishing the overhead, the payload, and the FEC. Thus, when the transmission rate of the OTU frame is increased, the bandwidths of the overhead, the payload, and the FEC increase with keeping the proportions the same.

The overhead and the FEC have data quantities sufficiently less than that of the payload, and thus may not be necessarily transmitted at a transmission rate same as that of the payload. Therefore, the increase in the bandwidths of the overhead and the FEC decreases the use efficiency of the bandwidth.

If only the payload is normally transmitted and the overhead and the FEC are transmitted when necessary to address the above described problem, the use efficiency of the bandwidth is improved. However, the receiving side second transmission device 2 detects the overhead as fixed-length data. Thus, when the overheads of which the lengths vary frame by frame are transmitted, synchronization among the overhead, the payload, and the FEC is difficult when the overhead, the payload, and the FEC are detected. Even when a synchronization unit is provided, the complicating process is performed. Thus, the sufficient processing speed is not obtained, and an error may occur in the OTU frame.

Figure 7:
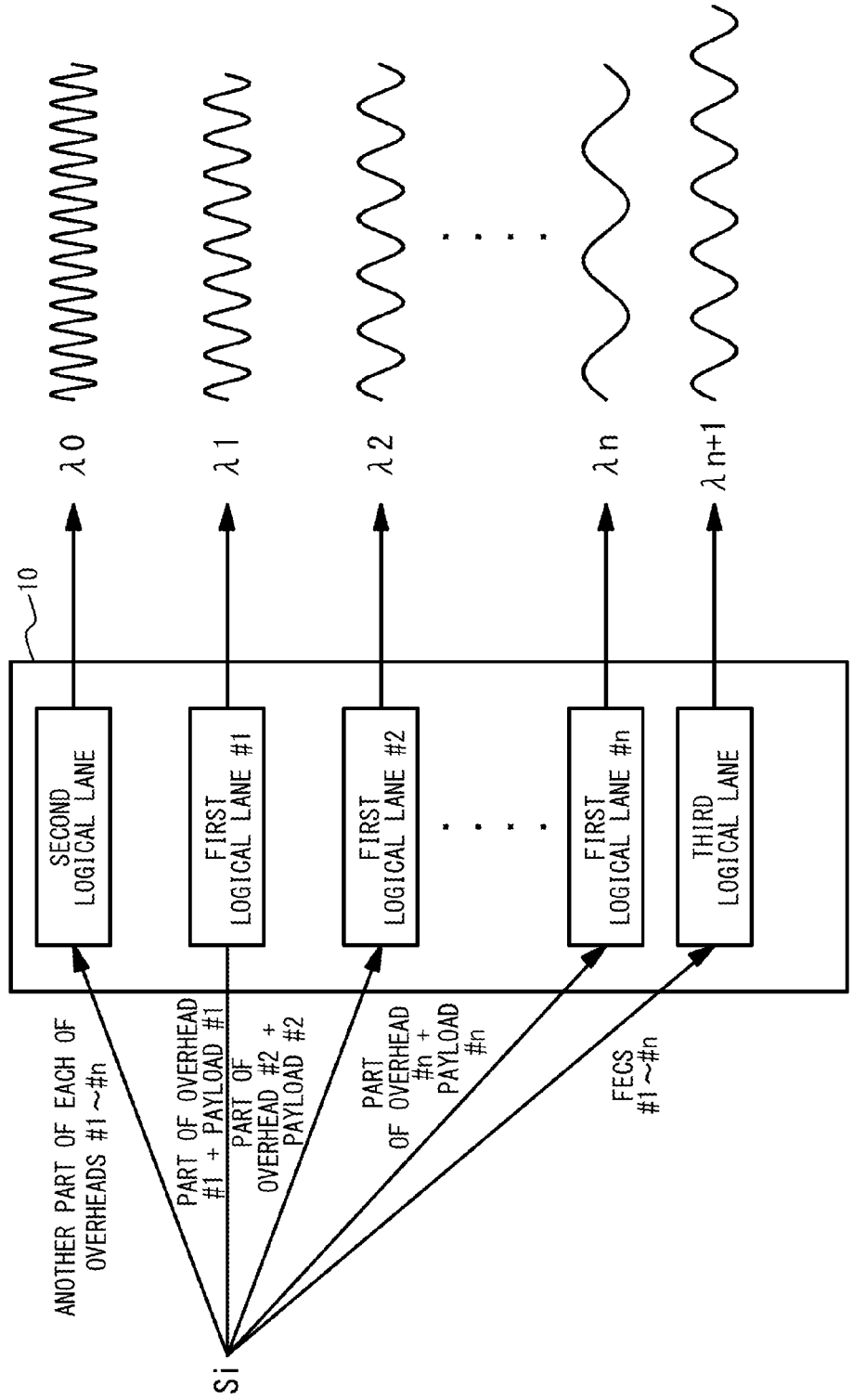
FIG. 7 is a diagram illustrating a transmission method in accordance with the embodiment.

The transmission method of the embodiment separates information unnecessary for reception processing of the payload from the payload, and transmits it via a logical lane different from a logical lane via which the payload is transmitted. For example, one of the logical lanes of the signal processor 10 is used for transmitting information having no direct relation to the payload of the information contained in the overhead, and the remaining logical lanes are used for transmitting the payload and the remaining information contained in the overhead. When the FEC is used, another logical lane is used for transmitting the FEC. FIG. 7 illustrates the transmission method in accordance with the embodiment.

The transmission method of the embodiment distributes the data of a client signal Si as payloads #1~#n (n is a natural number), and a part of each of overheads #1~#n to first logical lanes (first lanes) #1~#n together. Additionally, another part of each of the overheads #1~#n is distributed to a second logical lane (second lane). Here, the overheads #1~#n are generated to respectively correspond to the payloads #1~#n. The first logical lane may be one.

FECs #1~#n are distributed to a third logical lane (third lane). The FECs #1~#n are generated from the overheads #1~#n and the payloads #1~#n. Thus, a part of the overhead #i, the payload #i, and the FEC #i (i is a natural number of 1 or greater) are transmitted over individual carrier waves $\lambda 0$~$\lambda n+1$.

The data of the client signal Si is distributed to at least one logical lane of the first logical lanes #1~#n. That is to say, the data of individual client signals Si, . . . , Si+j (j is a natural number of 1 or greater) may be distributed to the first logical lanes #1~#n, or the data obtained by dividing a single client signal Si may be distributed to the first logical lanes #1~#n.

Thus, the data of the client signal Si may be distributed to the first logical lane #1, and the data of the client signal Si+1 may be distributed to the first logical lanes #2~#5 in unit of the above described blocks. Here, the number of the logical lanes used for the client signal Si may be determined in accordance with, for example, the data quantity of the client signal Si to perform efficient transmission. The overheads #1~#n, the payloads #1~#n, and the FECs #1~#n may be directly obtained from the client signal Si, or may be extract from an ODU frame, which is a frame excluding the FEC area from the OTU frame, generated from the client signal Si.

A first frame is generated in each of the first logical lanes #1~#n, and a second frame is generated in the second logical lane. A third frame is generated in the third logical lane. The first frames, the second frame, and the third frame are superimposed on the carrier waves $\lambda 0$~$\lambda n+1$ and transmitted.

The carrier waves $\lambda 0$~$\lambda n+1$ may be transmitted by 352-wave super multi-wavelength division multiplexing so called Spectrum sliced elastic optical path network (SLICE). SLICE extends 50-GHz intervals defined in ITU-T Recommendation, i.e., ITU-T frequency grids, to achieve wavelength multiplexing at intervals of 12.5 GHz. The present embodiment uses one wave for the second frame and one wave for the third frame, and thus uses the remaining 350 waves for the first frames, enabling high-capacity transmission.

Figure 8:
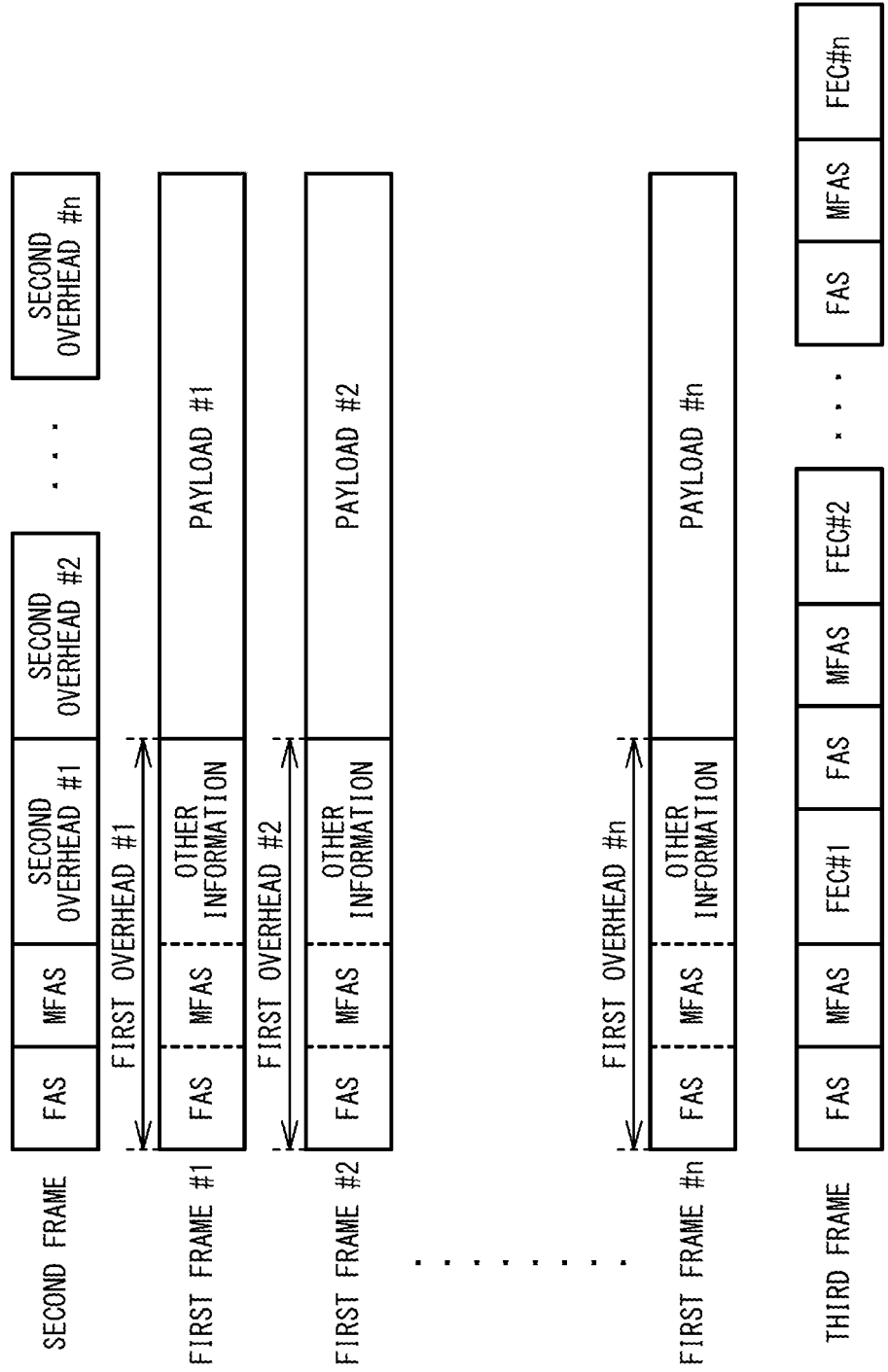
FIG. 8 is a diagram illustrating structures of first frames, a second frame, and a third frame.

FIG. 8 is a diagram illustrating the structures of the first frames, the second frame, and the third frame. In FIG. 8, each frame is sequentially transmitted from the data located at the left side of FIG. 8.

The overheads #1~#n corresponding to the payloads #1~#n are distinguished between first overheads #1~#n and second overheads #1~#n according to a level of relevance to the payloads #1~#n. Here, the level of relevance is determined by the degree of temporal proximity between the processing of the control information included in the overheads #1~#n and the processing of the payloads #1~#n in the reception processing performed in the receiving side second transmission device 2. For example, the BIP-8 is obtained by sequential parity operation of the data of the payload #1~#n, and thus is determined to have a high level of relevance. Therefore, the first overheads #1~#n include the BIP-8.

The first overheads #1~#n have a relatively high level of relevance to the payloads #1~#n, and thus are respectively contained in the first frames #1~#n together with the payloads #1~#n and transmitted. Information having a high level of relevance to the payload is, for example, information used in the reception processing of the payload, and is, for example, the FAS used for frame synchronization.

In contrast, the second overheads #1~#n have a relatively low level of relevance to the payloads #1~#n, and thus are contained in the second frame and transmitted. Information having a low level of relevance to the payload is, for example, information transmitted and received between devices, and is, for example, fault notification. The concrete examples of the contents of the first overheads #1~#n and the second overheads #1~#n will be described later.

The first frames #1~#n are transmitted via the first logical lanes #1~#n. The payload #i to which the first overhead #i is added is located in the first frame #i (i=1~n). The FAS and the MFAS for synchronization among the lanes are located in the leading location of the first overhead #i. When a single client signal Si is distributed to the logical lanes #i~#i+j, the data of the client signal Si is mapped into the payloads #i~#i+j. In this case, the first and second overheads #i~#i+j corresponding to the payloads #i~#i+j have the same contents.

The second frame contains the FAS and the MFAS for synchronization among the logical lanes in its leading location, and the second overheads #1~#n are sequentially located after the FAS and the MFAS. Thus, the second overheads #1~#n are time-divided and sequentially transmitted via the second logical lane.

The third frame contains the FASs and the MFASs for synchronization among the logical lanes, and the FECs #1~#n. The FAS and the MFAS are located before each of the FECs #1~#n. The FECs #1~#n are error correction codes used to correct errors of the data of the payloads #1~#n and the first and second overheads #1~#n. The FECs #1~#n are time-divided and sequentially transmitted via the third logical lane.

The present embodiment includes the second overheads #1~#n, the first overheads #1~#n and the payloads #1~#n, and the FECs #1~#n in individual frames, and transmits them separately. Thus, the ratio of the bandwidths can be separately changed in accordance with the transmission rate of each of the logical lanes.

Additionally, the second overheads #1~#n are separated from the overheads #1~#n of the payloads #1~#n and transmitted separately from the payloads #1~#n. Thus, the quantity of the data transmitted together with the payloads #1~#n is reduced. This allows the bandwidths of the payloads #1~#n to be allocated greater than the bandwidths of the second overheads #1~#n and the FECs #1~#n. Therefore, the use efficiency of the bandwidth is improved.

Moreover, the present embodiment separates the overheads #1~#n of the payloads #1~#n into the first overheads #1~#n and the second overheads #1~#n, and transmits the first overheads #1~#n via the first logical lanes #1~#n and the second overheads #1~#n via the second logical lane. Thus, the first overheads #1~#n having a relatively high level of relevance to the payloads #1~#n are transmitted at a transmission rate same as those of the payloads #1~#n, allowing the receiving side second transmission device 2 to perform normal reception processing.

For example, the first overheads #1~#n are the FAS and the MFAS added to the payloads #1~#n. The FAS and the MFAS are used for frame synchronization. Thus, if the payloads #1~#n are transmitted without the addition of the FAS and the MFAS, the payloads #1~#n are not normally received in the receiving side second transmission device 2. In other words, the first overheads #1~#n are payload information on the payloads #1~#n. As described above, the information used for frame synchronization is included in the first overheads #1~#n, and added to the payloads #1~#n and transmitted.

The second overheads #1~#n have a relatively low level of relevance to the payloads #1~#n, and thus causes no problem even when they are transmitted at a transmission rate different from those of the payloads #1~#n. For example, the second overheads #1~#n are management information transmitted and received for operation and maintenance management between the first transmission device 1 and the second transmission device 2. In other words, the second overheads #1~#n are management information on the first lanes. The management information is not used for the reception processing of the payload in the receiving side second transmission device 2, and thus does not affect the reception processing of the payloads #1~#n even when transmitted via the lane different from the lanes via which the payloads #1~#n are transmitted. As described above, information having no affect on the reception processing of the payloads #1~#n in the receiving side second transmission device 2 is selected as the second overheads #1~#n. Hereinafter, a more specific description will be given of the first overheads #1~#n and the second overheads #1~#n.

Figures 9A, 9B, 9C:
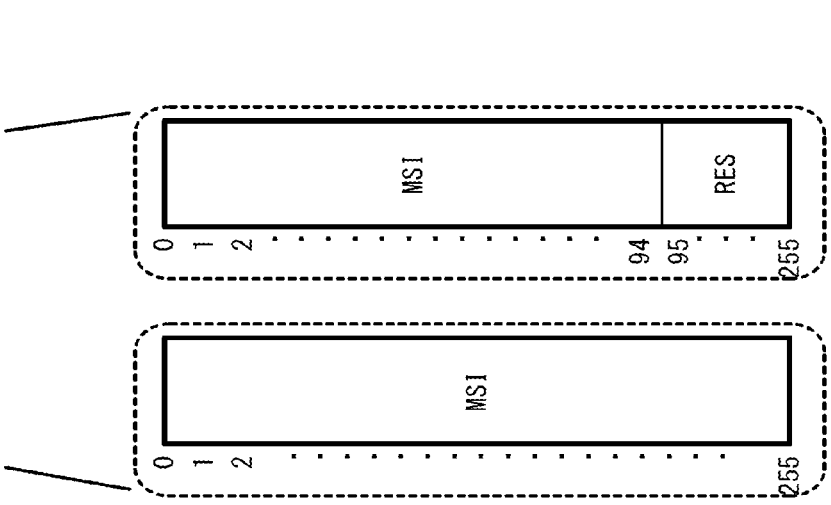
FIG. 9A through FIG. 9C are diagrams illustrating the content of a second overhead.

FIG. 9A through FIG. 9C illustrate the contents of the second overheads #1~#n. The content of the PM&TCM field in FIG. 9A is presented in FIG. 9B. The second overheads #1~#n are obtained by excluding unnecessary information such as RES from the control information of the overhead defined in ITU-T Recommendation G.709 and selecting information having a relatively low level of relevance to the payload.

The second overheads #1~#n contain SM, GCC0~GCC2, PM&TCM, TCM ACT, TCM1~TCM6, FTFL, PM, and APS/PCC of the control information contained in the overhead illustrated in FIG. 4A. Here, the SM, TCM1~TCM6, and PM fields contain only TTI.

The second overheads #1~#n further contain Multiplex Structure Identifier (MSI) #1 and MSI #2. The MSI #1 contains MSI, and the MSI #2 contains MSI and RES. The MSIs #1 and #2 are contained in the PSI field of the OPU overhead (see FIG. 4A) and indicate the contents of Optical channel Data Tributary Unit (ODTU) of the TS in the OPU. The length of the MSI is determined according to, for example, 352 waves of SLICE described above.

As described above, the second overheads #1~#n contain management information between nodes such as channel information having no direct relevance to the payloads #1~#n. Thus, the second overheads #1~#n are separated from the payloads #1~#n and transmitted via the second logical lane, having no affect on the reception processing of the payloads #1~#n even when they are received at a timing different from those of the payloads #1~#n in the receiving side second transmission device 2.

FIG. 10A through FIG. 10E illustrate the contents of the first overheads #1~#n. The contents of "*1"~"*4" in FIG. 10A are presented in FIG. 10B through FIG. 10E, respectively.

The first overheads #1~#n contain FAS, MFAS, SM, TCM1~TCM6, PM, EXP, NJO, JC1~JC6, and PJO of the control information contained in the overhead illustrated in FIG. 4A. Here, the SM, TCM1~TCM6, and PM fields contain information such as BIP-8 excluding TTI. The PJO is information defined in Row 4, Byte 17 of the OTU frame. Three, having common data, of JC1~JC6 are used when the Asynchronous Mapping Procedure (AMP) is used, and all of them are used when the Generic Mapping Procedure (GMP) is used.

The first overheads #1~#n further contain FEC information, through information, and a frame ID. The FEC information is 1-Bit data, and indicates existence or non-existence of the FEC #i corresponding to the first and second overheads #i and the payload #i. When the FEC information indicates "existence", the FEC #i of the third frame is generated. When the FEC information indicates "non-existence", dummy data having, for example, a fixed pattern is generated instead of the FEC #i, and inserted into the location of the FEC #i of the third frame. The FEC information is referred not only in the transmitting side first transmission device 1 but also in the receiving side second transmission device 2.

The through information is 1-bit data, and indicates whether it is possible to omit certain processing of the first and second overheads #i and the payload #i in the receiving side second transmission device 2. For example, when the data of a single client signal Si is mapped into the single first frame #i and transmitted, demapping of the client signal Si in the receiving side second transmission device 2 is unnecessary. Thus, the through information indicates "possible". On the other hand, when the data of a single client signal Si is mapped into the first frames #i~#i+j, the through information indicates "impossible".

The frame ID is 14-Bit data, and indicates a single client signal Si when the client signal Si is mapped into the first frames #i~#i+j and transmitted. That is to say, the frame ID is an identifier used to identify the payloads #i~#i+j generated from a single client signal (data signal) Si among the payloads #1~#n. The use of the frame ID enables to map the data of the client signal Si into the payloads #i~#i+j and transmit it, thus improving the transmission efficiency.

To support 352 waves of SLICE described above, 9 Bits, out of 14 Bits, of the frame ID are used for indicating 351 waves, which are the maximum number of wavelengths, and the remaining 5 Bits are used as the above described identifier. Thus, the frame ID can be divided into 32 groups. That is to say, first 9 Bits indicate waves used for carrier waves of the first frames #1~#n in the above described 351 waves, and the remaining 5 Bits are used to indicate 32 group numbers.

For example, when a single client signal is distributed to carrier waves with wavelengths of λ1, λ2, λ3, λ4, and λ5 and transmitted, and the corresponding group number is 1, the frame IDs of the first frames of the wavelengths λ1, λ2, λ3, λ4, and λ5 are respectively 1-1, 2-1, 3-1, 4-1, and 5-1. In another example, when a single client signal is distributed to carrier waves with wavelengths of λ10, λ100, λ255, and λ351 and transmitted, and the corresponding group number is 5, the frame IDs of the first frames of the wavelengths λ10, λ100, λ255, and λ351 are respectively 10-5, 100-5, 255-5, and 351-5.

In FIG. 10A through FIG. 10E, the FEC information, the through information, and the frame ID use 2 Bytes in total, and the number of groups are 32 at maximum in this case. When the number of groups is increased, the bits of the frame ID is required to be increased. As described above, the frame ID is used for demapping of the client signal Si in the receiving side second transmission device 2. The FEC information, the through information, and the frame ID are configured in the first and second transmission devices 1, 2 through a network management device in accordance with the user operation.

As described above, the first overheads #1~#n contain the FAS and the MFAS used for frame synchronization, and information (e.g., error monitoring information) for monitoring signal quality of each of the payloads #1~#n. Thus, the first overheads #1~#n are transmitted via the first logical lanes via which the payloads #1~#n are transmitted, and received at the same timing as the payloads #1~#n in the receiving side second transmission device 2. Therefore, the reception processing of the payloads #1~#n is performed without problems.

Figure 11:
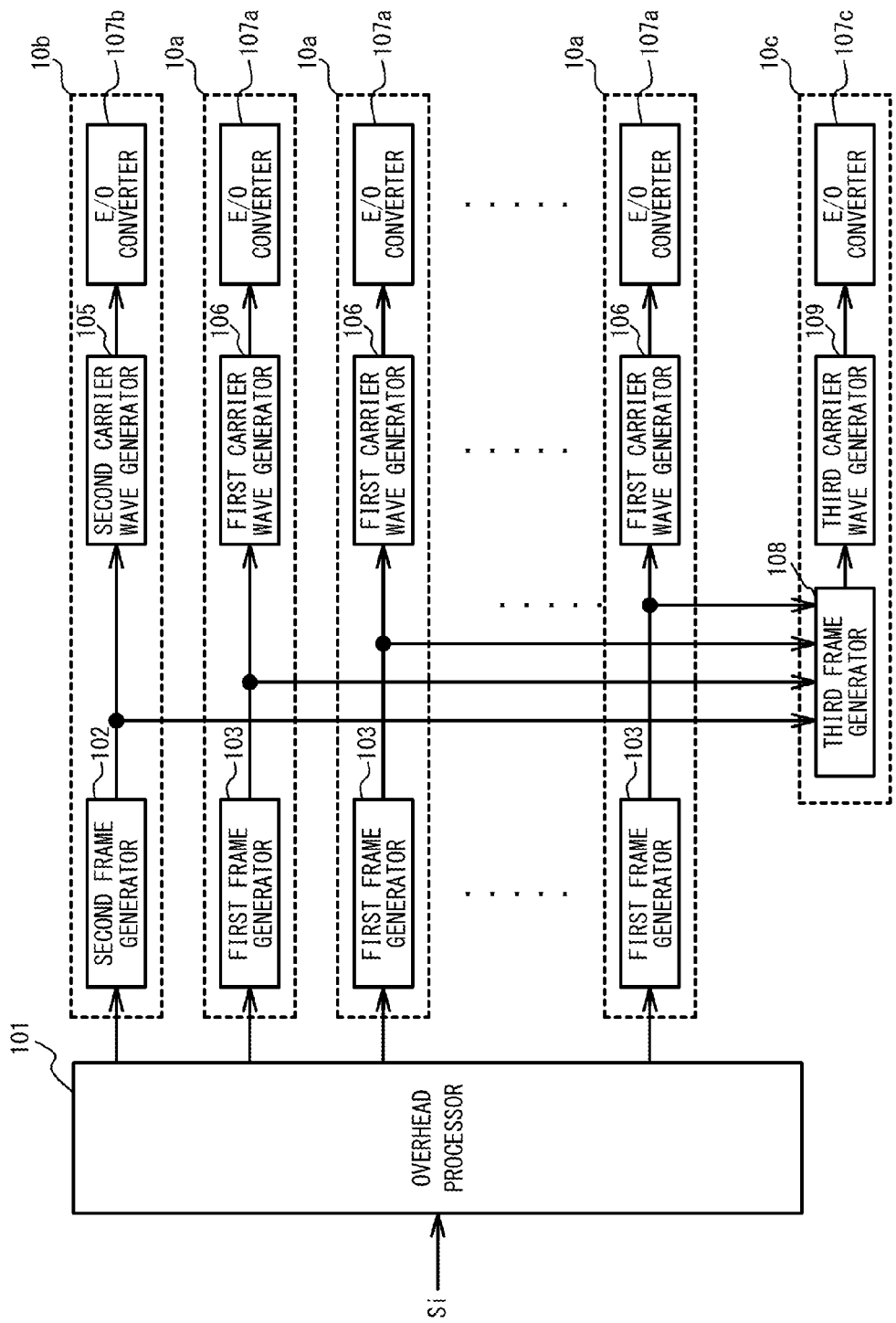
FIG. 11 is a configuration diagram of a transmission device in accordance with the embodiment.

FIG. 11 is a configuration diagram of the first transmission device 1 in accordance with the embodiment. More specifically, FIG. 11 illustrates a configuration of the signal processor 10. The signal processor 10 includes an overhead processor 101, first transmitters 10a, a second transmitter 10b, and a third transmitter 10c.

The overhead processor (payload generator) 101 generates the payloads #1~#n from the data of a client signal Si. Additionally, the overhead processor 101 generates the overheads #1~#n corresponding to the payloads #1~#n, and separates them into the first overheads #1~#n and the second overheads #1~#n. The overhead processor 101 outputs the first overheads #1~#n and the payloads #1~#n to the first transmitters 10a, and outputs the second overheads #1~#n to the second transmitter 10b.

The first transmitters 10a correspond to the first logical lanes #1~#n illustrated in FIG. 7. The second transmitter 10b corresponds to the second logical lane, and the third transmitter 10c corresponds to the third logical lane.

The first transmitters 10a transmit the payloads #1~#n to which the first overheads #1~#n (i.e., payload information on the payload) are added. The second transmitter 10b sequentially transmits the second overheads #1~#n (i.e., management information on the first logical lanes) corresponding to the payloads #1~#n. The third transmitter 10c sequentially transmits the FECs #1~#n that are error correction codes for correcting errors of the data of the payloads #1~#n and the first and second overheads #1~#n.

Each of the first transmitters 10a includes a first frame generator 103, a first carrier wave generator 106, and an electro-optic (E/O) converter 107a. The first frame generators 103 generate the first frames #1~#n from the payloads #1~#n and the first overheads #1~#n. Here, the first frame generator 103 functions as an adding unit that adds the first overhead #i to the payload #i.

The first carrier wave generators 106 generate carrier waves on which the first frames #1~#n are superimposed. The electro-optic converter 107a is, for example, an optical transceiver, and converts an electrical carrier wave to an optical carrier wave.

The second transmitter 10b includes a second frame generator 102, a second carrier wave generator 105, and an electro-optic converter 107b. The second frame generator 102 generates the second frame from the second overheads #1~#n. The second carrier wave generator 105 generates a carrier wave on which the second frame is superimposed. The electro-optic converter 107b operates in the same manner as the electro-optic converter 107a.

The third transmitter 10c includes a third frame generator 108, a third carrier wave generator 109, and an electro-optic converter 107c. The third frame generator (error correction code generator) 108 calculates the EFC values based on the first frames #1~#n and the second frame to generate the third frame. The third frame generator 108 does not calculate the FEC value and inserts dummy data instead of the FEC #i when the FEC information included in the first frame indicates "non-existence" as described above.

The third carrier wave generator 109 generates a carrier wave on which the third frame is superimposed. The electro-optic converter 107c operates in the same manner as the electro-optic converter 107a.

Figure 12:
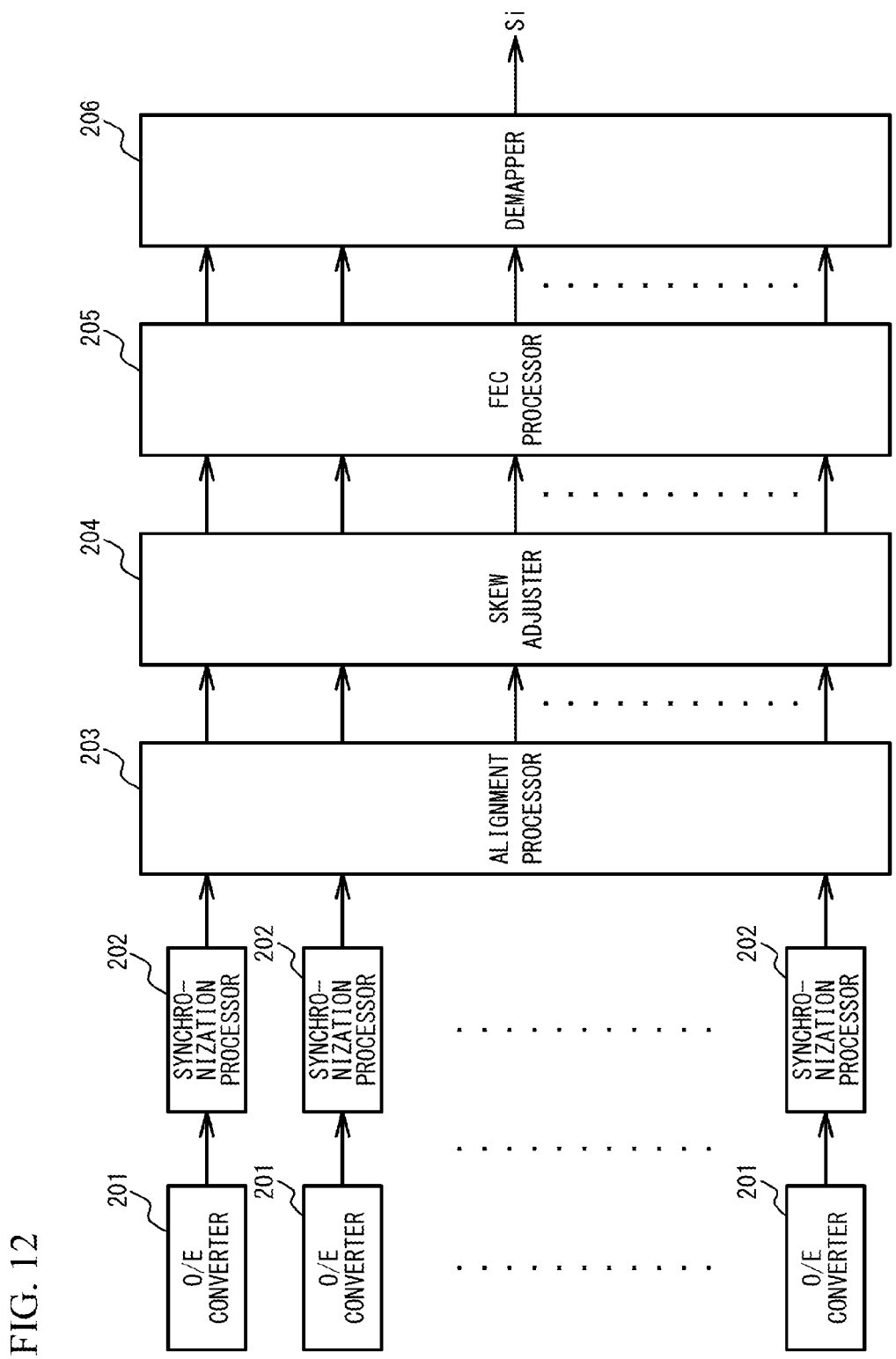
FIG. 12 is a configuration diagram of a receiving side second transmission device.

FIG. 12 is a configuration diagram of the receiving side second transmission device 2. More specifically, FIG. 12 illustrates a configuration of the signal processor 20. The signal processor 20 includes opto-electric (O/E) converters 201, synchronization processors 202, an alignment processor 203, a skew adjuster 204, an FEC processor 205, and a demapper 206.

The opto-electric converters 201 receive the optical signals transmitted from the first transmitters 10a, the second transmitter 10b, and the third transmitter 10c via the transmission line 3. The opto-electric converters 201 are, for example, optical receivers, and convert optical carrier waves to electrical carrier waves.

The opto-electric converters 201 and the synchronization processors 202 are interconnected, and function as receiving side logical lanes corresponding to the first logical lanes #1~#n, the second logical lane, and the third logical lane. The synchronization processors 202 detect the FASs and the MFASs contained in the first frames #1~#n, the second frame and the third frame to perform synchronization among the logical lanes.

The alignment processor 203 aligns the first frames #1~#n, the second frame, and the third frame in the order of the logical lanes based on the FASs. As described above, the FAS contains the LLM that is the lane number of the logical lane. More specifically, values of 0 to 239 are sequentially and repeatedly used for the LLM. Thus, the alignment processor 203 determines the actual lane number from the remainder calculated by dividing the LLM by the total number of the logical lanes (20 in the embodiment), and aligns the frames according to the actual lane numbers.

The skew adjuster 204 detects the FASs and the MFASs to adjust skews of the first frames #1~#n, the second frames, and the third frame. The skew adjustment is not necessary when the data of a single client signal Si is mapped into the single first frame #i and transmitted. Thus, when the aforementioned through information indicates "possible", the skew adjustment is not performed. That is to say, the skew adjustment is performed when the data of a single client signal Si is mapped into the multiple first frames #i~#i+j and transmitted, i.e., when the through information indicates "impossible".

The FEC processor 205 calculates the FEC values from the first and second overheads #1~#n and the payloads #1~#n, and compare them to the values of the FECs #1~#n contained in the third frame. The FEC processor 205 corrects errors of the first and second overheads #1~#n and the payloads #1~#n according to the results of the comparison. The FEC processor 205 does not calculate the FEC value and terminates the aforementioned dummy data when the aforementioned FEC information indicates "non-existence".

The demapper 206 demaps the client signal Si from the first frames #1~#n based on the frame IDs contained in the first overheads #1~#n of the first frames #1~#n. The demapper 206 generates the single client signal Si from the first frames #i~#i+j having the common group number in the frame ID among the first frames #1~#n. When the aforementioned through information indicates "possible", the first frame #i is generated from a single client signal Si, and thus the demapping from the first frame #i is not performed.

Figure 13:
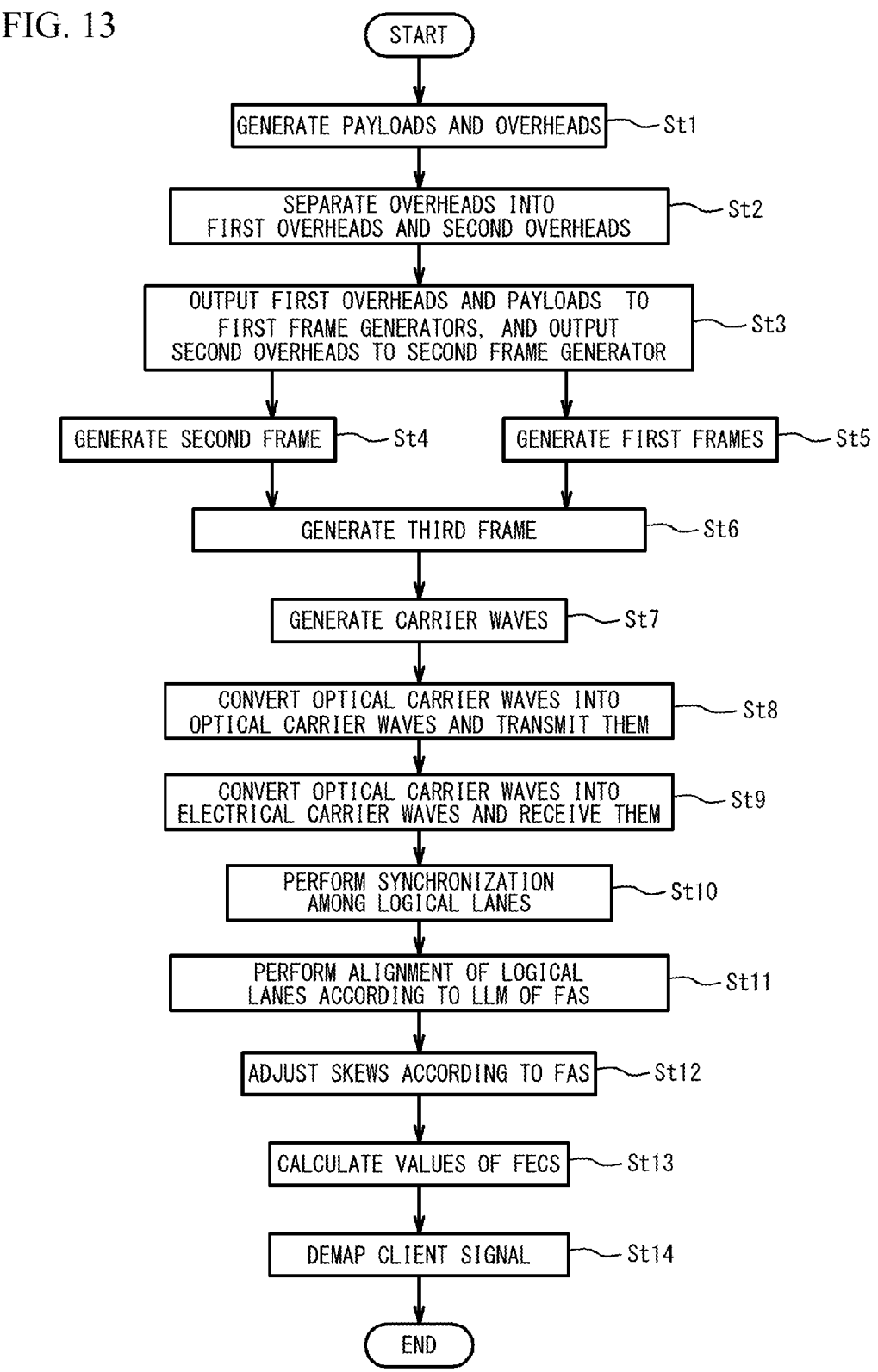
FIG. 13 is a flowchart of a transmission process of the transmission system in accordance with the embodiment.

FIG. 13 is a flowchart of a transmission process of the transmission system in accordance with the embodiment. The overhead processor 101 generates the payloads #1~#n from the data of a client signal Si input to the first transmission device 1, and generates the overheads #1~#n corresponding to the payloads #1~#n (step St1). The overhead processor 101 generates the frame IDs for the payloads #i~#i+j when the data of the single client signal Si is mapped into the payloads #i~#i+j.

Then, the overhead processor 101 separates the overheads #1~#n into the first overheads #1~#n and the second overheads #1~#n (step St2). In the present embodiment, the contents of the first overheads #1~#n are illustrated in FIG. 10A through FIG. 10E, and the contents of the second overheads #1~#n are illustrated in FIG. 9A through FIG. 9C. The first and second overheads #1~#n are distinguished based on the level of relevance to the payloads #1~#n, as described above.

Then, the overhead processor 101 outputs the first overheads #1~#n and the payloads #1~#n to the first frame generators 103, and outputs the second overheads #1~#n to the second frame generator 102 (step St3). When the data of the single client signal Si is mapped into the payloads #i~#i+j, the corresponding first and second overheads #i~#i+j are generated so that they have the same contents by duplicating.

The second frame generator 102 then generates the second frame (step St4). The generated second frame is output to the third frame generator 108 and the second carrier wave generator 105.

In parallel to the process of the step St4, the first frame generators 103 generate the first frames #1~#n (step St5). That is to say, the first frame generators 103 add the first overheads #1~#n to the payloads #1~#n. The generated first frames #1~#n are output to the third frame generator 108 and the first carrier wave generators 106.

The third frame generator 108 then generates the third frame based on the first frames #1~#n and the second frame (step St6). The third frame generator 108 calculates the FEC values for the first and second overheads #1~#n and the payloads #1~#n to obtain the FECs #1~#n. The generated third frame is output to the third carrier wave generator 109. When the FEC information indicates "non-existence", the third frame generator 108 inserts dummy data instead of the FEC #i.

The first carrier wave generators 106, the second carrier wave generator 105, and the third carrier wave generator 109 then generate carrier waves from the first frames #1~#n, the second frame, and the third frame, respectively (step St7). The generated carrier waves are output to the electro-optic converters 107a~107c.

The electro-optic converters 107a~107c convert the electrical carrier waves to the optical carrier waves, and transmit them to the receiving side second transmission device 2 via the transmission line 3 (step St8). At this time, the electro-optic converters 107a~107c perform a modulation process with use of a modulation method such as Quadrature Amplitude Modulation (QAM) or Frequency-Shift Keying (FSK). Thus, the electro-optic converters 107a~107c transmit the carrier waves at transmission rates in accordance with the modulation methods that they use.

As described above, the first transmitters 10a transmit the first overheads #1~#n together with the payloads #1~#n, and the second transmitter 10b transmits the second overheads #1~#n. The third transmitter 10c transmits the FECs #1~#n.

Thus, when the second transmitter 10b transmits the second overheads #1~#n at a transmission rate less than those of the first transmitters 10a, the bandwidths of the payloads #1~#n are increased. This is applicable to the case where the third transmitter 10c transmits the FECs #1~#n at a transmission rate less than those of the first transmitters 10a. In this case, the second overheads #1~#n and the FECs #1~#n are transmitted at a transmission rate less than the transmission rates of the payloads #1~#n to which the first overheads #1~#n are added.

Then, at the receiving side second transmission device 2, the opto-electric converters 201 convert the optical carrier waves input via the transmission line 3 to the electrical carrier waves to receive them (step St9). The opto-electric converters 201 perform a demodulation process according to the modulation process performed in the electro-optic converters 107a~107c having the corresponding logical lanes. The first frames #1~#n, the second frame, and the third frame superimposed on the carrier waves are output to the synchronization processors 202.

The synchronization processors 202 then detect the FASs and the MFASs in the first frames #1~#n, the second frame, and the third frame to perform synchronization among the logical lanes (step St10). The synchronized first frames #1~#n, the synchronized second frame, and the synchronized third frame are output to the alignment processor 203.

The alignment processor 203 then detects LLMs in the FASs of the first frames #1~#n, the second frame, and the third frame, obtains lane numbers based on the LLMs, and aligns the logical lanes according to the lane numbers (step St11). The aligned first frames #1~#n, the aligned second frame, and the aligned third frame are output to the skew adjuster 204.

The skew adjuster 204 then detects the FASs and the MFASs to adjust skews of the first frames #1~#n, the second frame, and the third frame (step St12). The skew adjuster 204 does not perform the skew adjustment of the frame #i when the through information indicates "possible". The skew adjuster 204 outputs the first frames #1~#n, the second frame, and the third frame to the FEC processor 205.

The FEC processor 205 then calculates the values of the FECs based on the first and second overheads #1~#n and the payloads #1~#n (step St13). The FEC processor 205 compares the calculated values of the FECs to the values of the FECs #1~#n in the third frame, and corrects the data of the corresponding frame based on the comparison results. At this time, when the FEC information indicates "non-existence, the FEC processor 205 does not perform calculation of the FEC of the frame.

The demapper 206 demaps the client signal Si from the first frames #1~#n (step St14). The demapper 206 demaps the client signal Si based on the frame IDs. For example, when the group numbers in the frame IDs of the first overhead #2 and the first overhead #3 are the same, the demapper 206 demaps the single client signal Si from the payload #2 and the payload #3. When the through information indicates "possible", the demapper 206 does not perform demapping from the first frame #i. The transmission process is performed as described above.

The present embodiment generates the first frames #1~#n, the second frame, and the third frame directly from the client signal Si, but does not intend to suggest any limitation. To comply with ITU-T Recommendation G.709, an ODU frame may be once generated from the client signal Si, and then the first frames #1~#n, the second frame, and the third frame may be generated from the ODU frame. The ODU frame has a structure excluding the FEC area from the OTU frame illustrated in FIG. 3.

Figure 14:
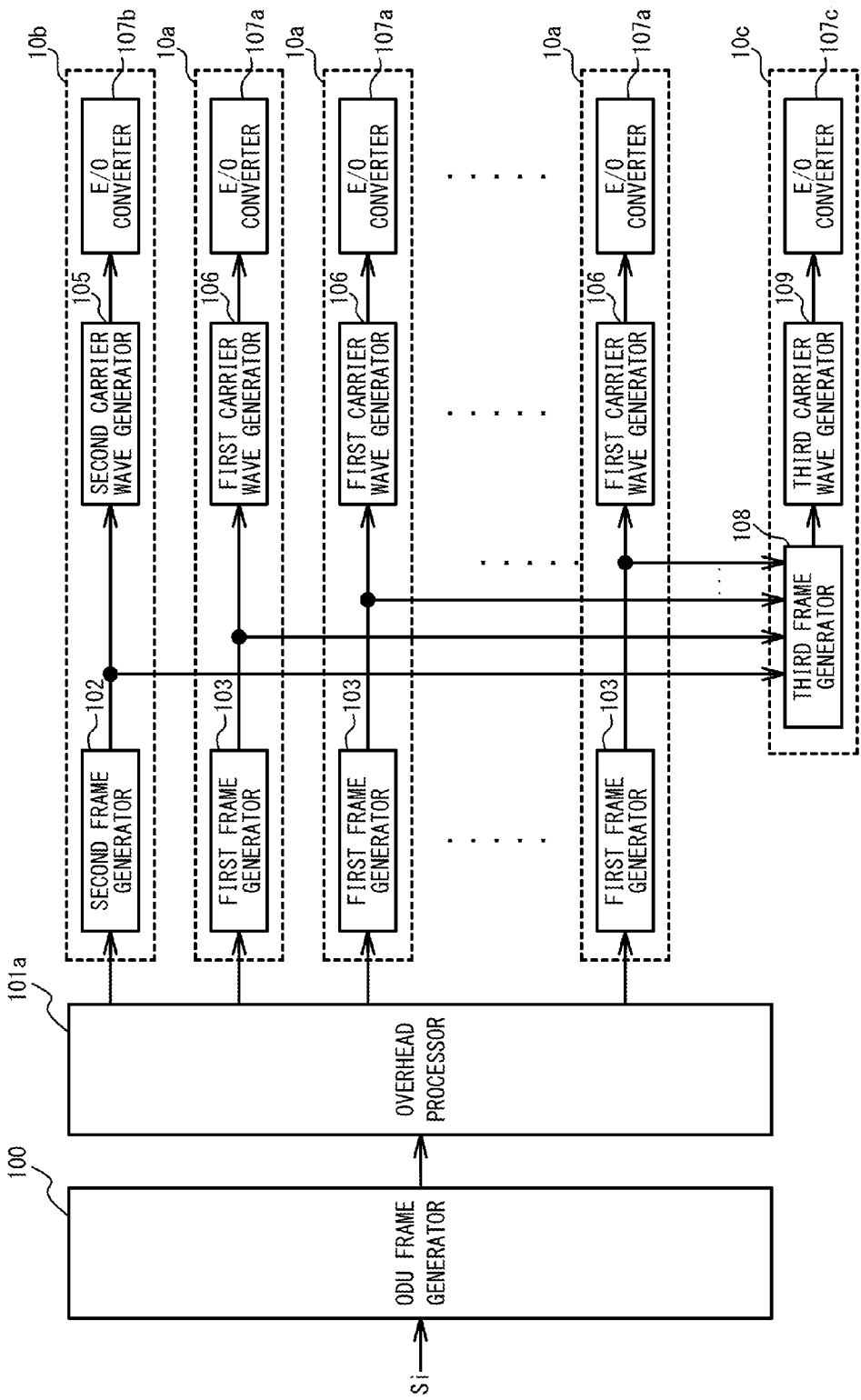
FIG. 14 is a configuration diagram of a transmission device in accordance with an alternative embodiment.

FIG. 14 is a configuration diagram of the first transmission device 1 in accordance with an alternative embodiment. More specifically, FIG. 14 illustrates an alternative configuration of the signal processor 10. In FIG. 14, the same reference numbers are assigned to the elements same as or similar to those of the first transmission device 1 illustrated in FIG. 11, and the description is omitted.

The signal processor 10 includes an ODU frame generator (frame generator) 100, an overhead processor 101a, the first transmitters 10a, the second transmitter 10b, and the third transmitter 10c. The ODU frame generator 100 generates an ODU frame (frame) from a client signal (data signal) Si. At this time, the data of the client signal Si is mapped into the payload area of the ODU frame.

The overhead processor 101a obtains control information from the overhead area of the generated ODU frame, and obtains the data of the client signal Si from the payload area. The overhead processor 101a generates and adds the FEC information, the through information, and the frame ID to the control information, and separates the control information into the first overhead and the second overhead. That is to say, the overhead processor 101a acts as a separation processor that separates the control information obtained from the ODU frame into a first group including the first overhead and a second group including the second overhead. In the present embodiment, the overhead is distinguish into the first overhead and the second overhead based on not only the level of relevance to the payload but also the location in the OTU frame illustrated in FIG. 3 to comply with ITU-T Recommendation G.709.

FIG. 15A through FIG. 15C illustrate the content of the second overhead in the present embodiment. The content of "*1" in FIG. 15A is presented in FIG. 15B, and the content of "*2" is presented in FIG. 15C.

The second overhead contains SM, GCCO, and PSI. The SM field contains the following subfields: TTI, BIP-8, BEI/BIAE, BDI, IAE, and RES. The PSI field contains the following subfields: Payload Type (PT), MSI, and RES. Data quantities of the MSI and the RES differ depending on the value of the PT and the type of High Order (HO) ODUk (k=1~4).

Figure 16A:
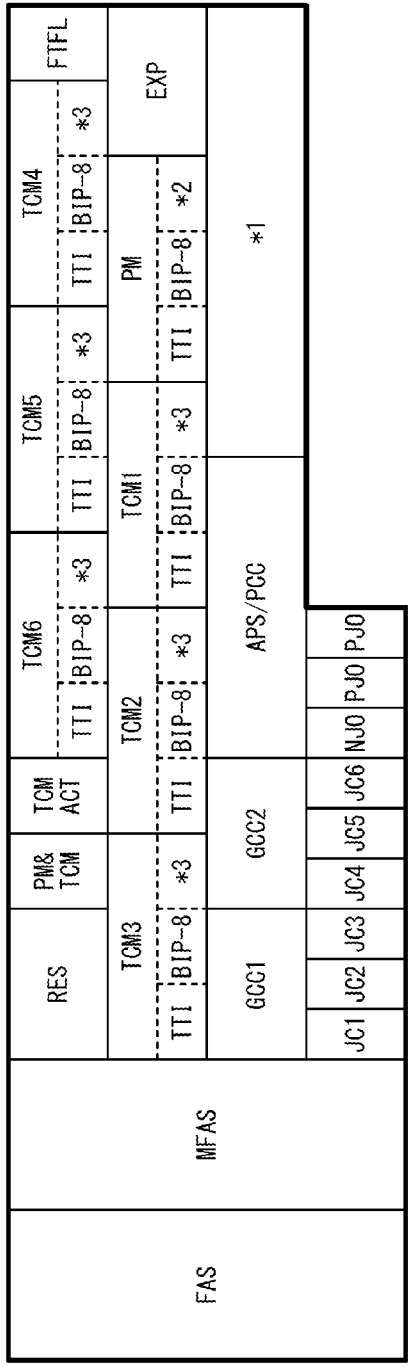
FIG. 16A through FIG. 16D are diagrams illustrating the content of the first overhead in the alternative embodiment.
Figure 16B:
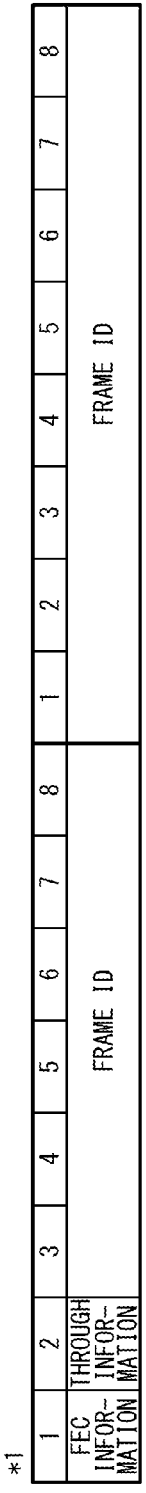
Figure 16C:
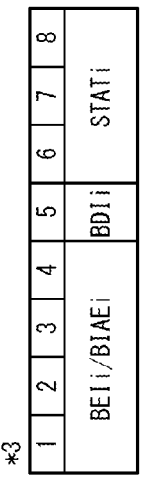
Figure 16D:
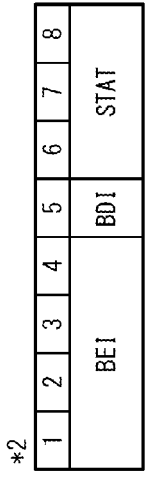

FIG. 16A through FIG. 16D illustrate the content of the first overhead in the present embodiment. The contents of "*1"~"*3" in FIG. 16A are presented in FIG. 16B through FIG. 16D, respectively.

The first overhead contains FAS, MFAS, GCC1, GCC2, PM&TCM, TCM ACT, TCM1~TCM6, FTFL, PM, APS/PCC, EXP, RES, NJO, JC, and PJO. Each of TCM1~TCM6 fields contains the following subfields: TTI, BIP-8, BEIi/BIAEi, BDIi, and STATi (i=1~6). The PM field contains the following subfields: TTI, BIP-8, BEI, BDI, and STAT. Three, having common data, of JC1~JC6, are used when the AMP is used, and all of them are used when the GMP is used.

The first overhead further contains the FEC information, the through information, and the frame ID. When the payload of a single ODU frame (i.e., a single client signal Si) is mapped into the single first frame #i and transmitted, the through information indicates "possible". On the other hand, when the payload of a single ODU frame is mapped into the multiple first frames #i~#i+j and transmitted, the through information indicates "impossible".

When the payload of a single ODU frame is mapped into the single first frame #i and transmitted, the frame ID indicates the ODU frame. In addition, "existence" or "non-existence" are commonly set to the FEC information of the payloads #i~#i+j generated from the same ODU frame. For example, when the payloads #1 and #2 are generated from a single ODU frame and "existence" is set to the FEC information on the payload #1, "existence" is also set to the FEC information on the payload #2. That is to say, the FEC information is set with respect to each ODU frame.

When mapping the data of the ODU frame into the payloads #i~#i+j, the overhead processor 101a generates the first and second overheads #i~#i+j having the same contents by duplicating.

The overhead processor 101a outputs the first overheads #1~#n and the payloads #1~#n to the first frame generators 103, and outputs the second overheads #1~#n to the second frame generator 102. The functions of the first frame generators 103, the second frame generator 102, the carrier wave generators 105, 106, 109, the electro-optic converters 107a~107c, and the third frame generator 108 have been described with reference to FIG. 11.

Figure 17:
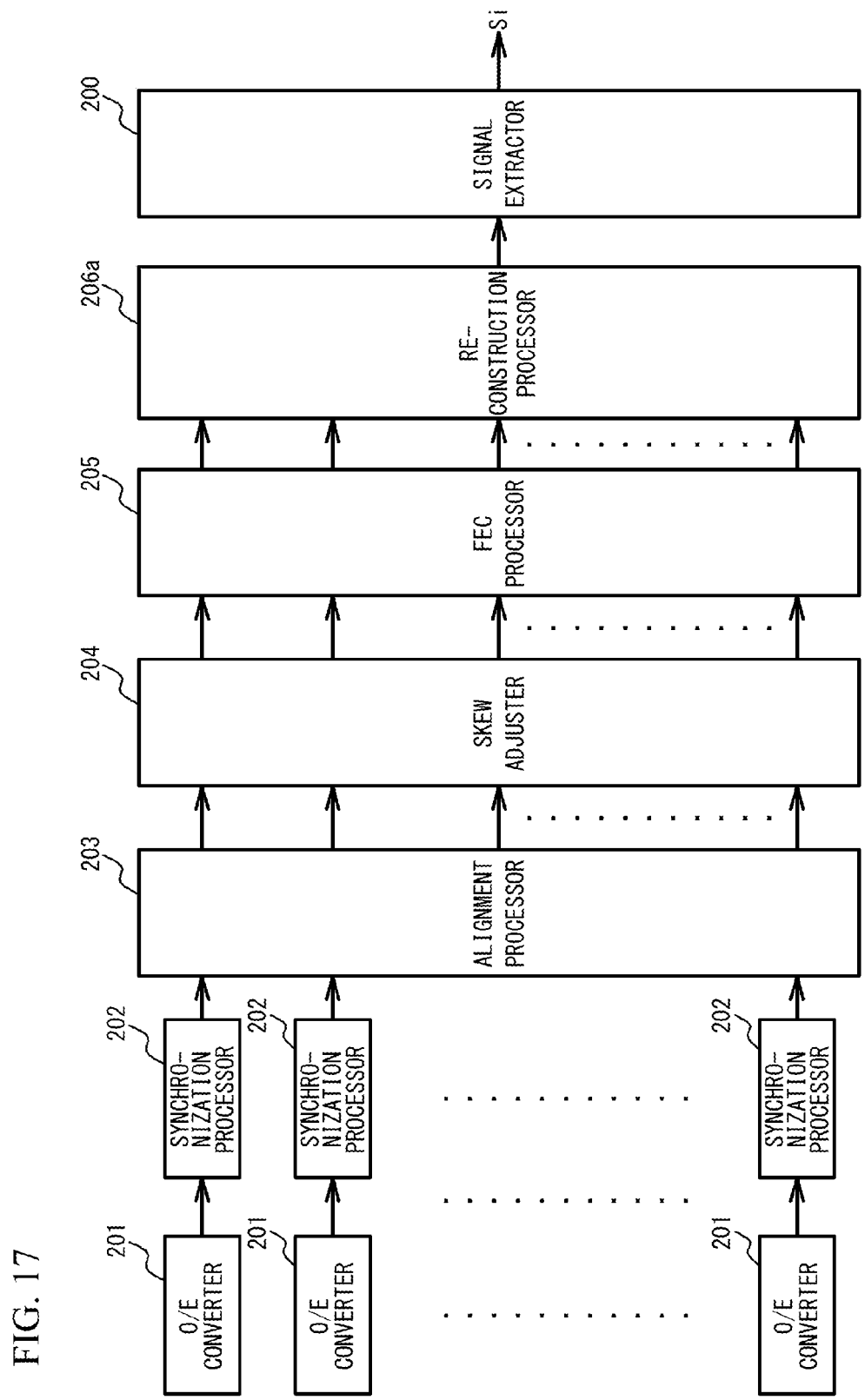
FIG. 17 is a configuration diagram of a receiving side second transmission device in the alternative embodiment.

FIG. 17 is a configuration diagram of the receiving side second transmission device 2 in the alternative embodiment. More specifically, FIG. 17 illustrates a configuration of the signal processor 20. In FIG. 17, the same reference numbers are assigned to the elements same as or similar to those of the second transmission device 2 illustrated in FIG. 12, and the description is omitted.

The signal processor 20 includes the opto-electric (O/E) converters 201, the synchronization processors 202, the alignment processor 203, the skew adjuster 204, the FEC processor 205, a reconstruction processor 206a, and a signal extractor 200. The opto-electric converters 201, the synchronization processors 202, the alignment processor 203, the skew adjuster 204, the FEC processor 205 have been described with reference to FIG. 12.

The reconstruction processor 206a reconstructs the ODU frame from the first frames #1~#n and the second frame based on the frame IDs. The reconstruction processor 206a generates the payload of the single ODU frame from the first frames #i~#i+j having the common frame ID among the first frames #1~#n. When the through information indicates "possible", the first frame #i is generated from a single ODU frame, and thus the reconstruction processing from the first frame #i is not performed.

The signal extractor 200 extracts the client signal Si from the ODU frame. That is to say, the signal extractor 200 obtains the client signal Si from the payload of the ODU frame.

Figure 18:
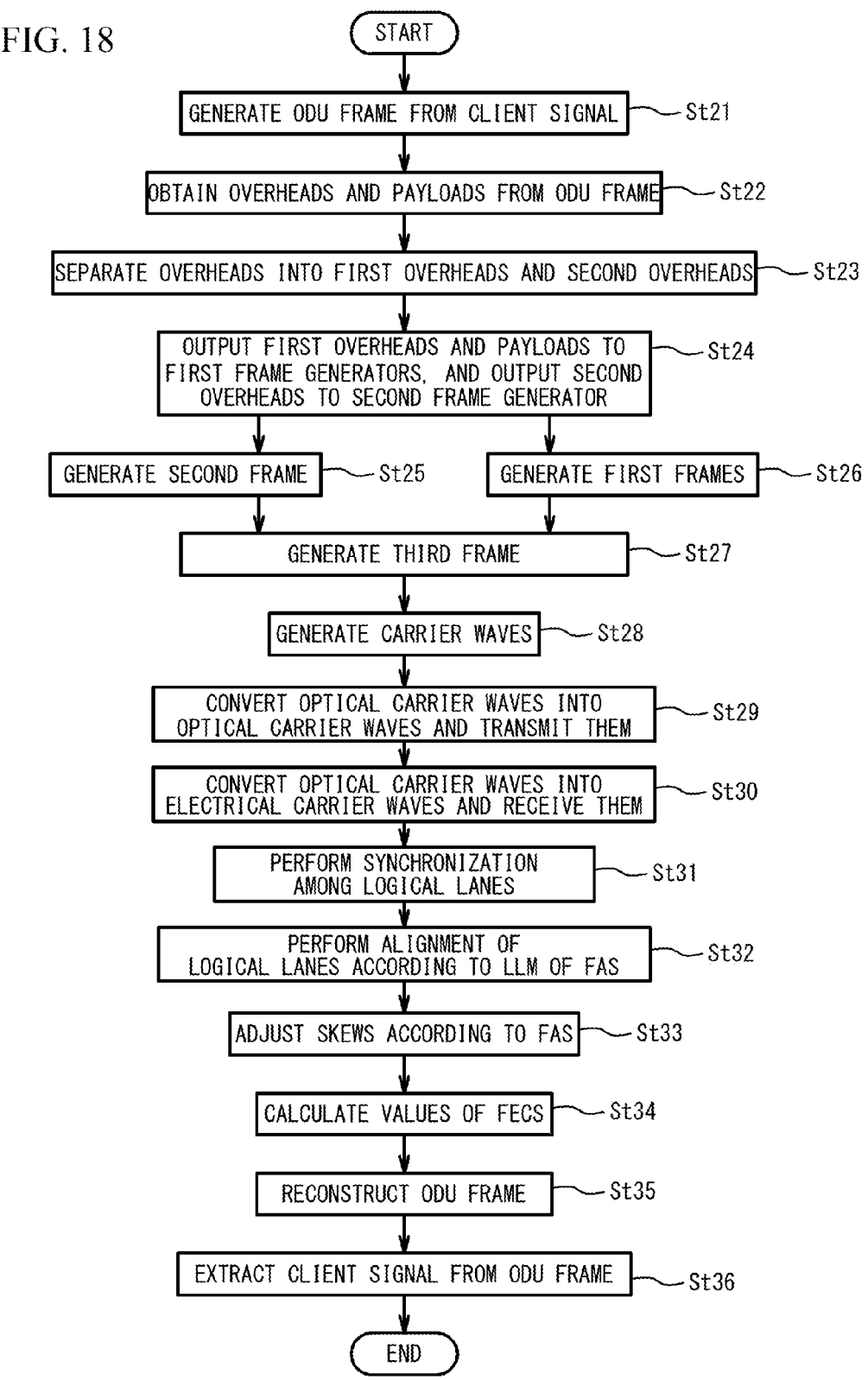
FIG. 18 is a flowchart of a transmission process of a transmission system in accordance with the alternative embodiment.

FIG. 18 is a flowchart of a transmission process of the transmission system in accordance with the alternative embodiment. In FIG. 18, the processes of steps St25~St34 are the same as those of the steps St4~St13 described in FIG. 13, and thus the description is omitted.

At step St21, the ODU frame generator 100 generates an ODU frame from a client signal Si. The generated ODU frame is output to the overhead processor 101a.

At step St22, the overhead processor 101a obtains the overheads #1~#n from the overhead area of the generated ODU frame and obtains the data of the client signal Si (the payloads #1~#n) from the payload area. At step St23, the overhead processor 101a separates the overheads #1~#n into the first overheads (the control information of the first group) #1~#n and the second overheads (the control information of the second group) #1~#n. The contents of the first overheads #1~#n and the second overheads #1~#n are presented in FIG. 16A through FIG. 16D and FIG. 15A through FIG. 15C, respectively.

At step St24, the first overheads #1~#n and the payloads #1~#n are output to the first frame generators 103. Additionally, the second overheads #1~#n are output to the second frame generator 102. Then, at steps St25~St34, the same processes as those of the step St4~St13 already described are performed.

At step St35, the reconstruction processor 206a reconstructs the ODU frame from the first frames #1~#n and the second frame based on the frame IDs. At step St36, the signal extractor 200 extracts the client signal Si from the ODU frame. The transmission process is performed as described above.

As described above, the first transmission device 1 of the embodiment includes the overhead processor 101 generating the payloads #1~#n, and the first frame generators 103 adding payload information on the payload (the first overheads #1~#n) to the payloads #1~#n. The payloads #1~#n to which the payload information is added are transmitted via the first logical lanes, and management information on the first logical lanes (the second overheads #1~#n) are transmitted via the second lane.

The first transmission device 1 of the embodiment transmits the second overheads #1~#n, and the first overheads #1~#n and the payloads #1~#n separately. Thus, when the rates (transmission rates) of the payloads #1~#n are configured to be greater than those of the second overheads #1~#n, the ratios of the bandwidths of the payloads #1~#n are made to be greater than the ratios of the bandwidths of the second overheads #1~#n. In the above described embodiment, the transmission rate of the electro-optic converter 107b of the second logical lane can be configured to be 2.4 Gbps, and the transmission rates of the electro-optic converters 107a of the first logical lanes #1~#n can be configured to be 100 Gbps, for example.

Additionally, the first transmission device 1 of the embodiment separates the second overheads #1~#n from the overheads #1~#n of the payloads #1~#n and transmits them separately from the payloads #1~#n, thus reducing the quantity of the data transmitted together with the payloads #1~#n. Thus, the first transmission device 1 of the embodiment improves the use efficiency of the bandwidth.

The transmission system of the embodiment includes the above described first transmission device 1, and the receiving side second transmission device 2 coupled to the first transmission device 1 via a transmission line. The receiving side second transmission device 2 receives signals transmitted via the first logical lanes and the second logical lane. The transmission system of the embodiment includes the above described first transmission device 1, and thus has the same advantage as the first transmission device 1 of the embodiment.

Additionally, the transmission method of the embodiment generates the payloads #1~#n, and adds payload information on the payloads #1~#n (the first overheads #1~#n) to the payloads #1~#n. The payloads #1~#n to which the payload information is added are transmitted via the first logical lanes, and management information on the first logical lanes (the second overheads #1~#n) is transmitted via the second lane. Thus, the transmission method of the embodiment has the same advantage as the first transmission device 1 of the embodiment.

The above described embodiments provide the third logical lane. However, when a client signal is transmitted via the short-distance transmission line 3, the error rate is low and an error correction process can be omitted. In such a case, the third logical lane may not be provided. In this case, the third logical lane may be used as the first logical lane. On the other hand, when a client signal is transmitted via the long-distance transmission line 3, the error rate is high, and a sophisticated error correction process is preferably performed. Thus, multiple third logical lanes may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A transmission device comprising:
   a payload processor obtaining a payload from a frame generated from a data signal, the frame transmitted via a first lane and a second lane;
   a separation processor configured to separate control information capable of being obtained from the frame into a first group including payload information on the payload and a second group including management information on the first lane; and
   an adding unit configured to add the control information of the first group to the payload, wherein
   the payload to which the control information of the first group is added is transmitted via the first lane, and the control information of the second group is transmitted via the second lane.

2. The transmission device according to claim 1, further comprising:
   an error correction code generator configured to generate an error correction code for correcting an error of the payload transmitted via the first lane and an error of the management information transmitted via the second lane, wherein
   the error correction code is transmitted via a third lane.

3. The transmission device according to claim 2, wherein the error correction code is transmitted at a transmission rate less than a transmission rate of-the payload to which the control information of the first group is added.

4. The transmission device according to claim 1, further comprising:
   a frame generator configured to generate the frame from the data signal, wherein
   the payload information and the management information are obtained from the frame.

5. The transmission device according to claim 1, wherein the payload information includes an identifier for identifying the payload generated from the data signal.

6. The transmission device according to claim 1, wherein the control information of the second group is transmitted at a transmission rate less than a transmission rate of the payload to which the control information of the first group is added.

7. A transmission system comprising:
   a first transmission device that obtains a payload from a frame transmitted via a first lane and a second lane, separates control information capable of being obtained from the frame into a first group including payload information on the payload and a second group including management information on the first lane, and adds the control information of the first group to the payload, the frame generated from a data signal; and
   a second transmission device coupled to the first transmission device, wherein
   the first transmission device transmits the payload to which the control information of the first group is added via the first lane, and transmits the control information of the second group via the second lane, and
   the second transmission device receives a signal transmitted via the first lane and a signal transmitted via the second lane.

8. A transmission method comprising:
   obtaining a payload from a frame generated from a data signal, the frame transmitted via a first lane and a second lane;
   separating control information capable of being obtained from the frame into a first group including payload information on the payload and a second group including management information on the first lane,
   adding the control information of the first group to the payload;
   transmitting the payload to which the control information of the first group is added via the first lane; and
   transmitting the control information of the second group via the second lane.

9. The transmission method according to claim 8, further comprising:
   transmitting an error correction code via a third lane, the error correction code being used to correct an error of the payload transmitted via the first lane and an error of the management information transmitted via the second lane.

10. The transmission method according to claim 9, wherein
    the transmitting of the error correction code includes transmitting the error correction code at a transmission rate less than a transmission rate of the payload to which the control information of the first group is added.

11. The transmission method according to claim 8, further comprising:
    obtaining the payload information and the management information from a frame generated from a data signal.

12. The transmission method according to claim 8, wherein
    the payload information includes an identifier used to identify the payload generated from the data signal.

13. The transmission method according to claim 8, wherein
    the transmitting of the control information of the second group includes transmitting the control information of the second group at a transmission rate less than a transmission rate of the payload to which the control information of the first group is added.

* * * * *